(12) United States Patent
Mahalingam et al.

(10) Patent No.: US 12,013,273 B2
(45) Date of Patent: Jun. 18, 2024

(54) DRILLING MUD FLOW METERING SYSTEM AND METHOD

(71) Applicant: Saudi Arabian Oil Company, Dhahran (SA)

(72) Inventors: Sakethraman Mahalingam, Aberdeen (GB); Michael Affleck, Aberdeen (GB)

(73) Assignee: Saudi Arabian Oil Company, Dhahran (SA)

( * ) Notice: Subject to any disclaimer, the term of this patent is extended or adjusted under 35 U.S.C. 154(b) by 165 days.

(21) Appl. No.: 17/678,524

(22) Filed: Feb. 23, 2022

(65) Prior Publication Data
US 2023/0266155 A1    Aug. 24, 2023

(51) Int. Cl.
*G01F 1/84*    (2006.01)
*E21B 21/08*    (2006.01)
(Continued)

(52) U.S. Cl.
CPC .............. *G01F 1/84* (2013.01); *E21B 21/08* (2013.01); *G01F 1/40* (2013.01); *G01F 1/88* (2013.01)

(58) Field of Classification Search
CPC .............. G01F 1/84; G01F 1/88; G01F 25/10
See application file for complete search history.

(56) References Cited

U.S. PATENT DOCUMENTS 7,249,500 B2    7/2007 Dutton et al.
7,603,916 B2    10/2009 Gysling
(Continued)

FOREIGN PATENT DOCUMENTS

DE    102019125682 A1    3/2021
EP    2616629 B1    2/2017

OTHER PUBLICATIONS

Hemp et al., "Theory of errors in Coriolis flowmeter readings due to compressibility of the fluid being metered", Flow Measurement and Instrumentation, vol. 17, pp. 359-369, 2006.
(Continued)

*Primary Examiner* — Erika J. Villaluna
(74) *Attorney, Agent, or Firm* — DINSMORE & SHOHL LLP

(57) ABSTRACT

A mud flow measurement system includes a flow pipe, a Coriolis meter, a differential pressure sensor, and a mud flow measurement module. The mud flow measurement module is configured to select a calibration curve corresponding to a drilling mud injected into the well, determine a measured density based on the signal from each of the vibration sensors and the selected calibration curve, determine a differential pressure across the Coriolis meter from the differential pressure sensor, and compute a calculated mass flow rate, $Q_{mass}$, of the multiphase mud flow using equation $$Q_{mass} = \frac{C_d A_t}{\sqrt{1-\beta^4}} \sqrt{2\rho * \Delta P},$$

where $C_d$ is a calibration constant, $A_t$ is a cross-sectional area of the measurement tube, $\beta$ is a ratio of the internal diameters of the flow pipe the measuring tube, $\rho$ is the density of the multiphase mud, and $\Delta P$ is the differential pressure across the Coriolis meter, where $\rho$ is the measured density determined from the Coriolis meter.

20 Claims, 8 Drawing Sheets

(51) Int. Cl.
    *G01F 1/40*     (2006.01)
    *G01F 1/88*     (2006.01)

(56) References Cited

U.S. PATENT DOCUMENTS

| | | |
|---|---|---|
| 8,452,551 B2 | 5/2013 | Gysling |
| 8,521,436 B2 | 8/2013 | Agar et al. |
| 9,581,475 B2 | 2/2017 | Johnson et al. |
| 10,598,527 B2 | 3/2020 | Dillard et al. |
| 2005/0044929 A1 | 3/2005 | Gysling et al. |
| 2013/0291620 A1 | 11/2013 | Singfield |
| 2016/0341594 A1 | 11/2016 | Singfield |
| 2022/0034777 A1 | 2/2022 | Parker et al. |
| 2022/0333971 A1 | 10/2022 | Rieder et al. |

OTHER PUBLICATIONS

Khodja et al., "Drilling Fluid Technology: Performances and Environmental Considerations", www.intechopen.com, Products and Services; from R&D to Final Solutions, pp. 227-256, Nov. 2, 2010.

Mahdianfar, "Pressure Control for Offshore Managed Pressure Drilling (MPD)", Norwegian University of Science and Technology, Thesis, Dec. 2014.

Notification of Transmittal of the International Search Report and the Written Opinion of the International Searching Authority, or the Declaration dated May 23, 2023 pertaining to International application No. PCT/US2023/012397 filed Feb. 6, 2023, pp. 1-17.

DRILLING MUD FLOW METERING SYSTEM AND METHOD

TECHNICAL FIELD

The present application discloses systems and methods directed to measuring multiphase drilling mud flow rate and density using a mud flow measurement system.

BACKGROUND

Flow metering systems and methods are employed in drilling processes such as managed pressure drilling (MPD), under-balanced drilling (UBD), and conventional open hydraulic drilling systems. Flow metering systems and methods measure the flow rate and density of drilling fluid or slurry, which is also referred to as drilling mud. Flow metering systems and methods may be configured to employ a Coriolis meter to obtain flow rate and density measurements. However, when a Coriolis meter is used in drilling fluid hydraulic systems where multiphase mud flows from the well through the Coriolis meter, inaccurate measurements of flow rate and density may be generated in the presence of multiphase mud.

Accordingly, there is a need for Coriolis meter based mud flow measurement systems and methods to provide accurate measurements in the presence of multiphase mud.

SUMMARY

In accordance with embodiments of the present disclosure, a mud flow measurement system includes a flow pipe, a Coriolis meter, a differential pressure sensor, and a mud flow measurement module. The flow pipe is configured to direct a portion of the multiphase mud flow from a well to the Coriolis meter and the differential pressure sensor. The Coriolis meter comprises a measuring tube and two or more vibration sensors. The measuring tube is induced to oscillate. The vibration sensors are positioned at different locations along the measuring tube. Each vibration sensor is configured to generate a signal in response to the multiphase mud flow through the Coriolis meter from the well. The differential pressure sensor is positioned to generate a signal corresponding to a pressure drop across the Coriolis meter in response to the multiphase mud flow flowing through the mud flow measurement system. The mud flow measurement module is coupled to the Coriolis meter and the differential pressure sensor, and is configured to select a calibration curve corresponding to a drilling mud injected into the well from a library of calibration curves for the Coriolis meter corresponding to different types of drilling muds, determine a measured density based on the signal from each of the vibration sensors of the Coriolis meter and the selected calibration curve, determine a differential pressure across the Coriolis meter based on one or more signals generated by the differential pressure sensor, compute a calculated mass flow rate, $Q_{mass}$, of the multiphase mud flow using equation $$Q_{mass} = \frac{C_d A_t}{\sqrt{1-\beta^4}} \sqrt{2\rho * \Delta P},$$

where $C_d$ is a calibration constant, $A_t$ is a cross-sectional area of the measurement tube of the Coriolis meter, $\beta$ is a ratio of an internal diameter of the flow pipe and an internal diameter of the measuring tube of the Coriolis meter, $\rho$ is the density of the multiphase mud, and $\Delta P$ is the differential pressure across the Coriolis meter determined from the differential pressure sensor, where $\rho$ is the measured density determined from the Coriolis meter.

In accordance with embodiments of the present disclosure, a mud flow measurement method implemented by a mud flow measurement system including a Coriolis meter having a measuring tube and two or more vibration sensors, a differential pressure sensor positioned to generate a signal corresponding to a pressure drop across the Coriolis meter in response to the multiphase mud flow flowing through the mud flow measurement system, and a flow pipe configured to direct a portion of the multiphase mud flow from a well to the Coriolis meter and the differential pressure sensor. The method includes selecting a calibration curve corresponding to a drilling mud injected into the well from a library of calibration curves for the Coriolis meter corresponding to different types of drilling muds; determining a measured density based on a signal from the Coriolis meter and the selected calibration curve; determining a differential pressure across the Coriolis meter based on one or more signals generated by the differential pressure sensor; and computing a calculated mass flow rate, $Q_{mass}$, of the multiphase mud flow using equation $$Q_{mass} = \frac{C_d A_t}{\sqrt{1-\beta^4}} \sqrt{2\rho * \Delta P},$$

where $C_d$ is a calibration constant, $A_t$ is a cross-sectional area of the measurement tube of the Coriolis meter, $\beta$ is a ratio of an internal diameter of the flow pipe and an internal diameter of the measuring tube of the Coriolis meter, $\rho$ is the density of the multiphase mud, and $\Delta P$ is the differential pressure across the Coriolis meter determined from the differential pressure sensor, where $\rho$ is the measured density determined from the Coriolis meter.

In accordance with embodiments of the present disclosure, a mud flow measurement system includes a flow pipe, a Coriolis meter, a differential pressure sensor, and a mud flow measurement module. The flow pipe is configured to direct a portion of the multiphase mud flow from a well to the Coriolis meter and the differential pressure sensor. The Coriolis meter comprises a measuring tube and two or more vibration sensors. The measuring tube is induced to oscillate. The vibration sensors are positioned at different locations along the measuring tube. Each vibration sensor is configured to generate a signal in response to the multiphase mud flow through the Coriolis meter from the well. The differential pressure sensor is positioned to generate a signal corresponding to a pressure drop across the Coriolis meter in response to the multiphase mud flow flowing through the mud flow measurement system. The mud flow measurement module is coupled to the Coriolis meter and the differential pressure sensor, and is configured to select a calibration curve corresponding to a drilling mud injected into the well from a library of calibration curves for the Coriolis meter corresponding to different types of drilling muds, determine a measured mass flow rate based on the signal from each of the vibration sensors of the Coriolis meter and the selected calibration curve, determine a differential pressure across the Coriolis meter based on one or more signals generated by the differential pressure sensor, compute a calculated density, $\rho$, of the multiphase mud flow based on the measured mass flow rate from the Coriolis meter and the differential pressure across the Coriolis meter.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
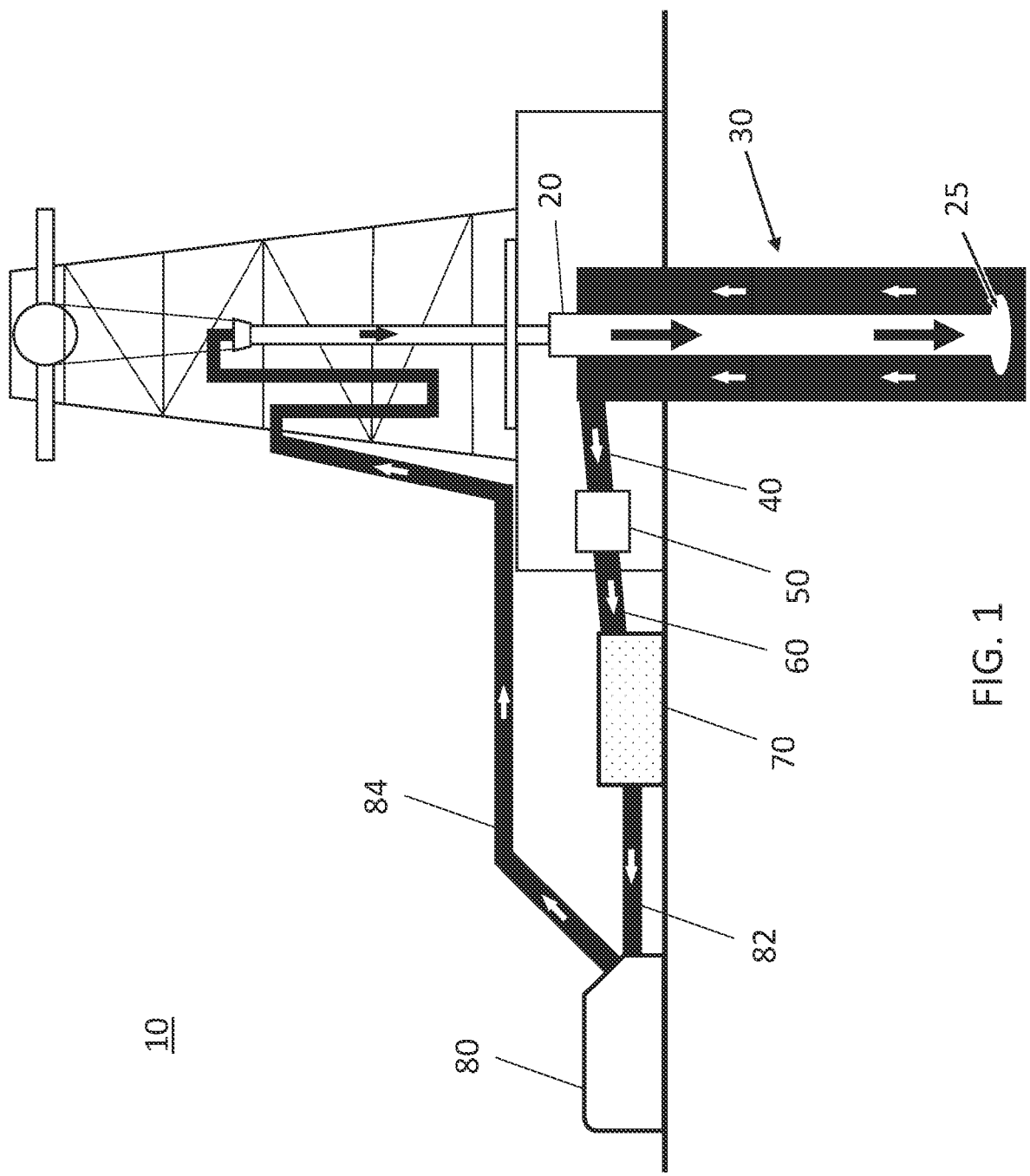
FIG. 1 is an illustrative schematic of a conventional drilling system according to one or more embodiments of the present disclosure.

Embodiments disclosed herein include systems and methods for measure the flow rate and density of drilling fluid or slurry, which is also referred to as drilling mud in managed pressure drilling (MPD), under-balanced drilling (UBD) or conventional open hydraulic system (e.g., zero surface backpressure) drilling systems. More specifically, embodiments of the present disclosure include a measurement system constructed around a Coriolis meter and a method of calibrating the system to handle multiphase mud from the well. The mud flow measurement system includes additional pressure sensors and a mud flow measurement module to achieve an accurate calculation of both mud flow rate and density. As used herein "multiphase mud" refers to the drilling mud that exits a well which may be having two or more phases including a primary phase, a secondary phase, and optionally a tertiary phase. The primary phase is the drilling mud that is initially introduced into the well. A secondary phase may be fluid with a lower density than the drilling mud, such as oil or gas. A tertiary phase may be a material with a density higher than the drilling mud, such as rock cuttings flowing out of the well. The term multiphase mud may also be referred to as multiphase drilling mud, multiphase fluid, or fluid herein.

For example, the density of drilling fluid may vary typically between 0.3 gram per cubic centimeters (gm/cc) to 1.7 gm/cc. Water from the formation may have a density between 1 and 1.2 gm/cc. Oil may have a density between 0.70 and 0.95 gm/cc while formation gas may have a density of 0.05 gm/cc to 0.1 gm/cc depending upon pressure and temperature. The rock cuttings, or tertiary material, that will carried with mud flowing out of the well has a much higher density, for example, a density of 2.0 gm/cc to 2.9 gm/cc.

As described in more detail herein, the mud flow measurement system includes a flow pipe, a Coriolis meter, a differential pressure sensor, and a mud flow measurement module. In embodiments, a calibration process is performed where various types of drilling mud having various amounts of water, oil, and gas entrained in it are introduced through a Coriolis meter such that calibration curves for correcting density and mass flow rates based on the measured frequency and phase shift values from the Coriolis meter are generated. Additionally, a differential pressure sensor configured measure a pressure drop of the flow through the Coriolis meter thereby providing a second estimate of the flow rate of the mud. The calibration process generates a set of calibration curves to implement depending on the type of mud used for drilling. Once a set of calibration curves are developed for various types of muds having various amounts of water, oil, and gas therein, the mud flow measurement module coupled to the Coriolis meter and a differential pressure sensor, receives measures of frequency, phase shift, and pressure drop values from the sensors and determines a corrected density of the flowing multiphase mud and mass flow rate of the multiphase mud. In some embodiments, the corrected density of the flowing multiphase mud and the mass flow rate of the multiphase fluid, adjustments to the control of the annulus pressure in the managed drilling process (MDP) may be executed to achieve a more efficient drilling process.

The following will now describe these systems and methods in more detail with reference to the drawings and where like numbers refer to like structures.

Referring to FIG. 1, a conventional drilling system 10 is depicted. The depicted conventional drilling system 10 illustrates the circulation of mud during the drilling process, which is depicted by the arrows shown therein. Drilling mud is injected into the drill pipe 20 into the wellbore forming a well 30. Drilling mud is pumped down the hollow drill pipe 20 to the drill bit 25, where it exits the drill pipe 20 and then is flushed back up the wellbore to the surface. The drilling mud, by hydrostatic pressure, helps prevent the collapse of unstable strata into the wellbore and the intrusion of water from water-bearing strata that may be encountered.

Drilling muds are traditionally based on water, either fresh water, seawater, naturally occurring brines, or prepared brines. Many muds are oil-based, using direct products of petroleum refining such as diesel oil or mineral oil as the fluid matrix. In addition, various so-called synthetic-based muds are prepared using highly refined fluid compounds that are made to more-exacting property specifications than traditional petroleum-based oils. In general, water-based muds may be used for the less-demanding drilling of conventional vertical wells at medium depths, whereas oil-based muds are better for greater depths or in directional or horizontal drilling, which place greater stress on the drilling apparatus. Synthetic-based muds were developed in response to environmental concerns over oil-based fluids, though all drilling muds are highly regulated in their composition, and in some cases specific combinations are banned from use in certain environments.

A typical water-based drilling mud contains a clay, usually bentonite, to give it enough viscosity to carry cutting chips to the surface, as well as a mineral such as barite (barium sulfate) to increase the weight of the column enough to stabilize the borehole. Smaller quantities of hundreds of other ingredients might be added, such as caustic soda (sodium hydroxide) to increase alkalinity and decrease corrosion, salts such as potassium chloride to reduce infiltration of water from the drilling fluid into the rock formation, and various petroleum-derived drilling lubricants. Oil- and synthetic-based muds contain water (usually a brine), bentonite and barite for viscosity and weight, and various emulsifiers and detergents for lubricity.

As discussed above, drilling mud is pumped down the hollow drill pipe 20 to the drill bit 25, where it exits the pipe and then is flushed back up the wellbore of the well 30 to the surface. The drilling mud that is flushed back to the surface may be collected by a flow pipe 40. The flow pipe 40 directs the returned drilling mud through a flow meter 50 and into a mud pit 70. Before entering the mud pit 70, the drilling mud may flow through a shale shaker 60, where tertiary phase materials entrained in the returned drilling mud are removed. Larger drill cuttings are removed by passing the returned mud through one or more vibrating screens, and sometimes fine cuttings are removed by passing the mud through centrifuges. That is, drilling muds are cleaned and recirculated. However, some muds, such as water-based muds, can be discharged into the surrounding environment in a regulated manner. Cleaned drilling mud is blended with new drilling mud for reuse down the wellbore.

Drilling mud in the mud pit 70 may be suctioned out by a mud pump 80 through a suction pipe 82 fluidly coupling the mud pit 70 to the mud pump 80. The mud pump 80 then delivers pressurized drilling mud back to the drill pipe 20 through one or more discharge pipes 84. To achieve an efficient drilling process controlling the bottomhole pressure, which in a dynamic condition is a function of the hydrostatic column's pressure and annular friction pressure. Annular pressure management is primarily controlled by mud density and mud pump flow rates. In an open-vessel environment, drilling operations are often subject to kick-stuck-kick-stuck scenarios that reduce the efficiency of the pump and add expenses to the drilling operation. This is difficult to manage in conventional open-vessel environments unless the well is shut-in.

Figure 2:
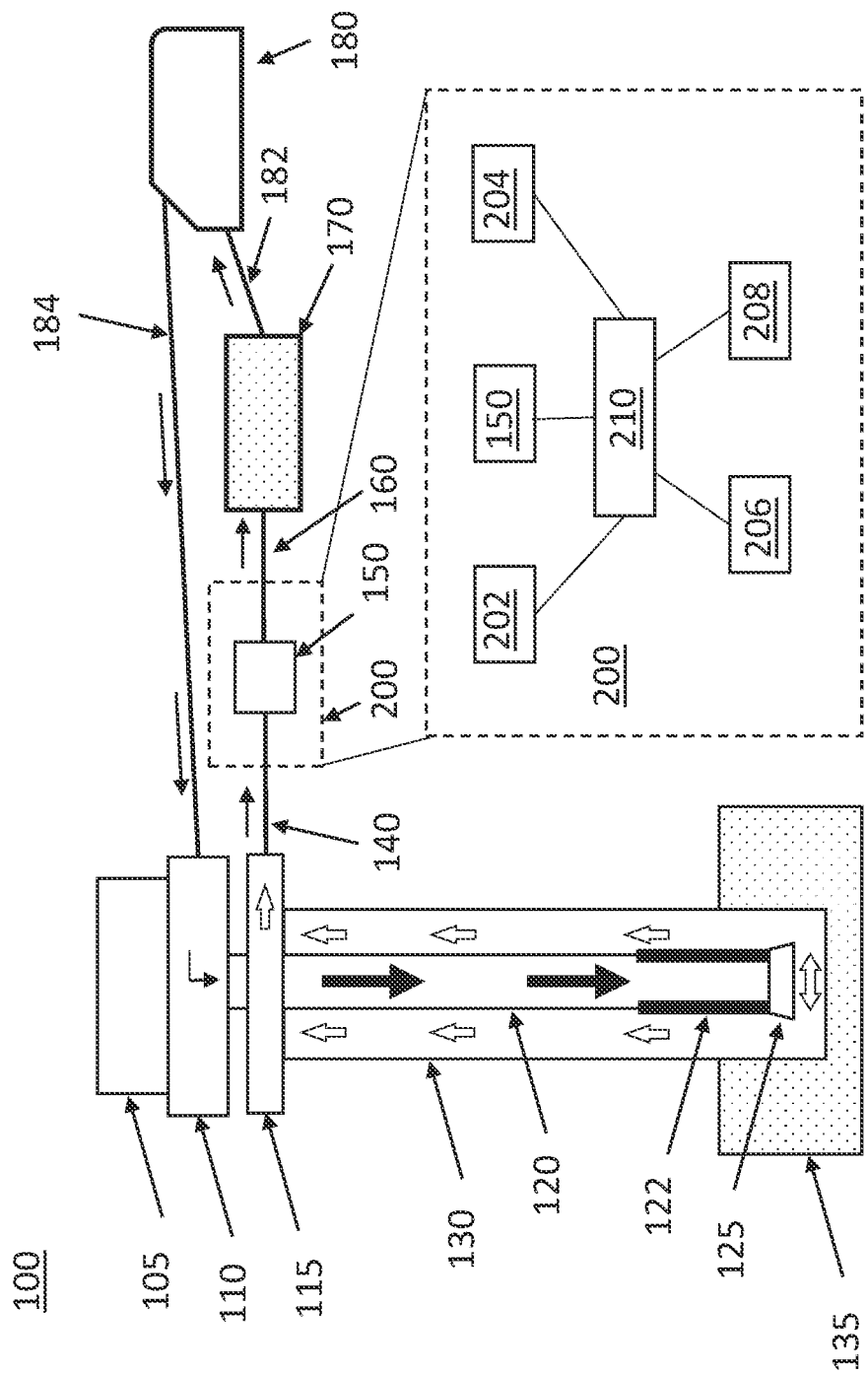
FIG. 2 is an illustrative schematic of a MPD system according to one or more embodiments of the present disclosure.

MPD methods offer better ways to control bottomhole pressure through an adaptive drilling process that aims to precisely control annulus pressure to achieve an efficient drilling process. Referring to FIG. 2 an illustrative simplified diagram of a MPD system 100 is depicted. The MPD system 100 uses a combination of tools, sensors, and a control system in order to achieve precise well control. The MPD system 100 limits both the amount of drilling mud lost into the formation and the amount of formation fluid carried to the surface with the drilling mud. A mud flow measurement system 150, which is described in more detail herein, is a part of the MPD system 100 as it measures the flow rate and the density of the multiphase drilling mud flowing out of the well 130. In particular, if the drilling mud is being lost into the formation, the flow rate of the drilling mud portion of the multiphase drilling mud out of the well 130 is likely to be smaller than the mud flow rate of the drilling mud flowing into the well. If excess formation fluids, such as oil, water, and/or gas get entrained in the drilling mud and are carried to the surface, the flow rate and density of the multiphase drilling mud as measured by the mud flow measurement system 150, utilizing a Coriolis meter, is likely to be different from the drilling mud flow rate into the well 130. The underbalanced drilling technique, which is considered a subset of MPD, intentionally reduces bottom hole hydrostatic pressure to invite formation fluids into the wellbore. This multiphase fluid or slurry, containing substantial solids load in addition to liquid and gas phases, is thereafter circulated to surface.

As depicted in FIG. 2, an MPD system 100 includes a rotating control head 110 and drive unit 105 coupled to a drill pipe 120. The drive unit 105 is configured to rotatably drive the drill pipe 120 and connected drill bit 125 in the wellbore of the well 130. The rotating control head 110 may be configured to receive drilling mud under pressure and inject the drilling mud through the drill pipe 120 into the well 130 or formation 135 which the drill bit 125 is actively operating. The rotating control head 110 seals the top of annulus 122 while allowing rotation and vertical movement of the drill pipe 120, diverts flow from the wellbore to the mud flow measurement system 150 and the dynamic annular pressure control (DAPC) system 200.

The annulus 122 is the void between the drill pipe 120 or any other piping, tubing or casing and the piping, tubing, or casing surrounding it. The annulus 122 provides for fluid circulation in the well 130. While drilling, drilling mud is pumped down the inside of the drill pipe 120 and pushes the drill cuttings up the annulus 122 to the surface, where the cuttings are removed from the drilling mud by the shale shakers 160. Additionally, the mud pit 170 collects the drilling mud. Drilling mud in the mud pit 170 may be suctioned out by a mud pump 180 through a suction pipe 182 fluidly coupling the mud pit 170 to the mud pump 180. The mud pump 180 then delivers pressurized drilling mud back to the drill pipe 120 through one or more discharge pipes 184 and the rotating control head 110.

As the drilling mud returns to the surface from the well 130, a flow pipe 140 fluidly coupled to the well head 115, for example, directs the drilling mud through the mud flow measurement system 150. In a MPD system 100, the mud flow measurement system 150 may be a component of the dynamic annular pressure control (DAPC) system 200. DAPC system 200 is designed to control the bottomhole pressure during drilling and connection operations. The DAPC system 200 calculates and automatically applies the required back-pressure to the annulus 122. The DAPC system 200 includes components such as a choke manifold 202, the mud flow measurement system 150, a back-pressure pump 204, a hydraulics model 206, input/output hardware 208, and a pressure managing computing device 210.

A choke manifold 202 is controlled by the pressure managing computing device 210 to maintain bottomhole pressure at the set-point. Choke adjustments affect back-pressure and consequently the bottomhole pressure. The chokes used in MPD operations are generally installed in parallel to the well-control chokes. The reason is that the MPD choke manifold 202 is under constant use, and therefore it is reasonable to have a separate, dedicated system for well control.

When there is no flow through the choke, it is impossible to control pressure in the well. For this reason, a pump is included in the back-pressure generation system to provide enough flow through the choke continuously. A back-pressure pump 204 is usually a low volume, positive-displacement triplex pump connected to the choke manifold 202. The pressure managing computing device 210 continuously monitors return drilling mud flow from the well 130, and when it senses that the return flow is not enough to maintain the required back pressure (e.g., during connections, and trips or when the rig pumps are off), it automatically turns on the back-pressure pump 204.

The hydraulics model 206 is a component of most MPD systems 100. The hydraulics model 206 is used for planning, monitoring, control, performance optimization, fault detection and prevention (e.g. in hole cleaning conditions, pack off, stuck pipe, mud losses, kick, well-bore integrity). The DAPC system 200 may also include input/output hardware 216 that is communicatively coupled to one or more pumps, sensors, valves, or the like. The input/output hardware 216 may include a monitor, keyboard, mouse, printer, camera, microphone, speaker, and/or other device for receiving, sending, and/or presenting information.

Current MPD systems utilize a Coriolis meter as the sensor in the mud flow measurement system 150 for measuring flow rate and density of the flowing drilling mud. However, when two different fluids (i.e., multiphase drilling mud having two or phases entrained in the drilling mud) flow through the Coriolis meter, the density and mas flow rate readings from the meter are likely to be inaccurate. Embodiments described herein present a mud flow measurement system 150 utilizing Coriolis meter and additional pressure sensors and a mud flow measurement module to achieve an accurate calculation of both mud flow rate and density.

Figure 3:
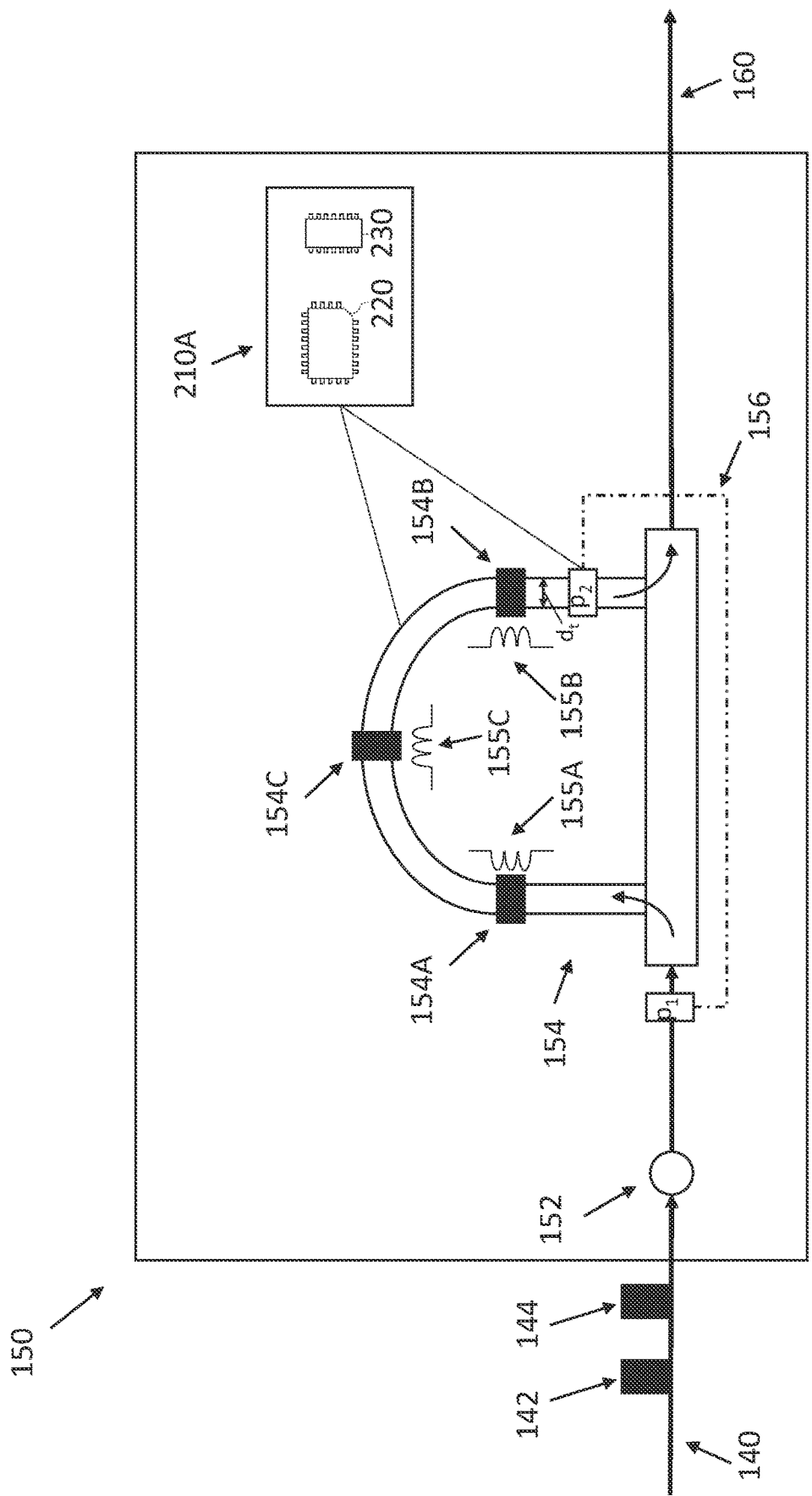
FIG. 3 is an illustrative diagram of the mud flow measurement system according to one or more embodiments of the present disclosure.

Referring to FIG. 3, an illustrative diagram of the mud flow measurement system 150 according to embodiments disclosed herein is depicted. The mud flow measurement system 150 may be a component of the DAPC system 200 or may be an independent system implemented in a drilling system. Embodiments of the mud flow measurement system 150 include, an absolute pressure sensor 152, a Coriolis meter 154, a differential pressure sensor 156, and a mud flow measurement module 210A. The mud flow measurement module 210A is a computing device including a processor 220 and a memory component 230. The processor 220 may include any processing component(s) configured to receive and execute programming instructions (such as from a data storage component and/or the memory component 230). The processor 220 may be an electric controller, an integrated circuit, a microchip, a computer, or any other computing device. The processor 220 is communicatively coupled to the other components of the drilling system (e.g., the DAPC system 200) or mud flow measurement system 150 through a local interface and/or the network interface hardware. Furthermore, while the embodiment depicted in FIG. 3 includes a single processor 220, some embodiments may include more than one processor 220. Furthermore, it is understood that the functionality of the mud flow measurement module 210A may be implemented in the pressure managing computing device 210 of the DAPC system 200.

The memory component 230 may be machine-readable memory (which may also be referred to herein as a non-transitory processor readable memory or memory). The memory component 230 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 230 may be configured to store flow measurement operating logic and/or calibration logic, each of which may be embodied as a computer program, firmware, or hardware, as an example, and will be described in more detail herein.

Still referring to FIG. 3, an absolute pressure sensor 152 may be positioned upstream of the Coriolis meter 154 to obtain a pressure of the multiphase drilling mud flow in the flow pipe into the mud flow measurement system 150. Since the volume occupied by compressible fluids such as hydrocarbon gas or Nitrogen or $CO_2$ trapped in the drilling mud is a function of the absolute pressure, the volume occupied by the gas or other such compressible fluids within the flow pipe 140 has a direct impact on a calibration curve of the Coriolis meter 154. Hence by measuring the absolute pressure the change in volume of the compressible fluids can be corrected for when generating (e.g., during calibration) and/or selecting (e.g. during operation) the calibration curve. The compressible fluids may also be dissolved within the other fluids within the flow pipe, such as crude oil or water, and may come out of the drilling mud due to changes in pressure. As such by knowing the pressure adjustments to the flow meter calculations can account for such behavior.

The mud flow measurement system 150 of the present disclosure positions a differential pressure sensor 156 to measure a pressure drop across the Coriolis meter 154. That is, the differential pressure sensor 156 is configured to measure the pressure drop across the Coriolis meter 154, where the pressure drop is used to calculate a mass flow rate and/or density with the measurements from the Coriolis meter 154 as described in more detail herein. Such a configuration improves the measurement accuracy of density and mass flow rate when multiphase drilling fluid flows through the mud flow measurement system 150. In some embodiments, the Coriolis meter 154 is a split path type or a serial path type meter.

To understand the inaccuracy present with using only a Coriolis meter 154 when two different fluids flow through the Coriolis meter, a brief overview of the operation of the Coriolis meter 154 will now be described. A Coriolis meter 154 operates on the principle of measuring the Coriolis force when the fluid passes through one or a pair of flow tubes within the meter. The flow tube, which is also referred to herein as the measurement tube, includes two or more vibration sensors and a driving mechanism. A first vibration sensor includes a first ferromagnetic material 154A coupled to the measurement tube and a first sensing coil 155A is positioned along the entry portion of measurement tube. That is, the entry portion of the measurement tube is the portion of the measurement tube where fluid flow enters the measurement tube during operation. A second vibration sensor includes a first ferromagnetic material 154B coupled to the measurement tube and a second sensing coil 155B is positioned along the exit portion of measurement tube. That is, the exit portion of the measurement tube is the portion of the measurement tube where fluid flow exits the measurement tube during operation.

Figure 4:
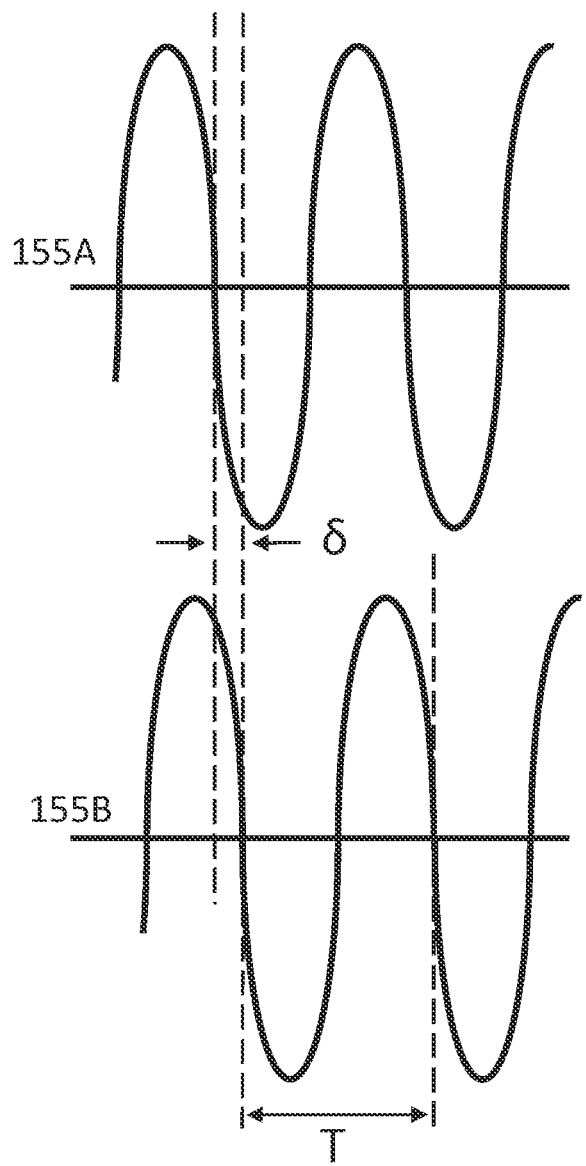
FIG. 4 depicts illustrative signals generated by the first vibration sensor and the second vibration sensor according to one or more embodiments of the present disclosure.

Additionally, the driving mechanism includes a driving coil 155C and a third ferromagnetic material 154C coupled to the measurement tube. The driving mechanism is positioned along the measurement tube between the first vibration sensor and the second vibration sensor. The driving coil 155C when energized by an electrical signal induces the third ferromagnetic material 154C and measurement tube coupled thereto to oscillate at a predefined frequency. As fluid flows through the measurement tube, the first vibration sensor and the second vibration each generate a signal in response to the flowing fluid. FIG. 4 depicts illustrative signals generated by the first sensing coil 155A of the first vibration sensor and the second sensing coil 155B of the second vibration sensor. The resonant frequency, fr, (i.e., fr=1/T) of the measurement tube vibrations corresponds to a measurement of the density of the fluid flowing through the Coriolis meter 154. The phase shift, δ, in the vibration between the first sensing coil 155A of the first vibration sensor and the second sensing coil 155B of the second vibration sensor in the meter corresponds to a measurement of the mass flow rate.

As described above, when two different fluids flow through the Coriolis meter 154, the density and mass flow readings from the meter may be inaccurate. The extent of these errors depends on the relative densities and viscosities of the fluids involved. The errors are caused because of two competing phenomena. The first phenomenon called "phase decoupling" is caused by the buoyancy of lighter fluid entrained in heavier fluid resulting in decoupled response to the imposed vibration. Phase decoupling causes the contents of the flow tubes to be underestimated and hence the errors in density and mass flow rate are both negative. The second phenomenon called "compressibility" is due to the larger than expected reaction force causes by the compressible nature of the fluid entrained in an incompressible fluid. This is true when a compressible fluid like gas is entrained in the mud. This error tends to always cause positive errors in both density and mass flow rate. In addition, when different fluids are flowing together, the vibrations induced on the measurement tubes become damped and additional energy is needed to keep the Coriolis meter working. Embodiments of the mud flow measurement system 150 use a digital Coriolis meter 154 in which the vibration of the measurement tubes in the meter may be controlled precisely and is more tolerant of multiphase drilling muds flowing through the Coriolis meter 154.

The errors in density and mass flow rate may be predicted using the theory proposed by Hemp & Kutin, 2006. [Hemp, J., and Kutin, J., "Theory of errors in Coriolis flowmeter readings due to compressibility of the fluid being metered", Flow Measurement and Instrumentation, 2006, Vol. 17, 359-369]. According to Hemp & Kutin, the errors in density, $E_d$, and mass flow rate, $E_m$, from a Coriolis meter 154 are as follows in Equations 1 and 2.

$$E_d = \frac{-2\alpha}{1-\alpha} + \frac{1}{4}\left[\frac{w_1 b}{c}\right]^2 \quad \text{(Eq. 1)}$$

$$E_m = \frac{-2\alpha}{1-\alpha} + \frac{1}{2}\left[\frac{w_1 b}{c}\right]^2, \quad \text{(Eq. 2)}$$

where $E_d$ is the error in density, $E_m$ is the error in mass flow rate, α is the gas volume fraction, $w_1$ is the actual resonance frequency of vibration for two-phase fluid, b is the inner diameter of the measurement tube, and c is the speed of sound in two phase fluid. The relations shown in Equations 1 and 2 depend on the viscosity of the liquid and the density of the gas at the Coriolis meter. The forms shown in Equations 1 and 2 are particular for a liquid with zero viscosity aerated with a gas of zero density. The first term in both equations is the error due to phase decoupling and the second term is the error due to gas compressibility.

Through calibration of the Coriolis meter 154 as described in more detail herein, Equations 1 and 2 are transformed into the following Equations 3 and 4, where new constants $A_1$, $A_2$, $B_1$, and $B_2$ are added.

$$E_d = \frac{-2\alpha}{1-\alpha}A_1 + \frac{1}{4}A_2\left[\frac{w_1 b}{c}\right]^2 \quad \text{(Eq. 3)}$$

$$E_m = \frac{-2\alpha}{1-\alpha}B_1 + \frac{1}{2}B_2\left[\frac{w_1 b}{c}\right]^2 \quad \text{(Eq. 4)}$$

The constants are developed based on testing the Coriolis meter 154 under various types of drilling mud flowing with various amounts of water, oil and gas entrained in it. In some embodiments, an injection system is included in the system. In such embodiments, testing the Coriolis meter 154 includes passing a first type of drilling mud through the Coriolis meter 154 while injecting varying quantities of gas (e.g., nitrogen gas in quantities up to 2%) through the gas injection port 142 and varying quantities of liquid (e.g., water for water based muds or oil for oil-based muds) through the liquid injection port 144.

In embodiments, the constants generated based on testing the Coriolis meter 154 under various types of drilling mud flowing with various amounts of water, oil and gas entrained in it are programmed into the mud flow measurement module 210A. That is, calibration curves are developed by testing the meter under different combinations of gases, liquids and muds, each with a range of densities, viscosities, and flow rates.

Figure 5A:
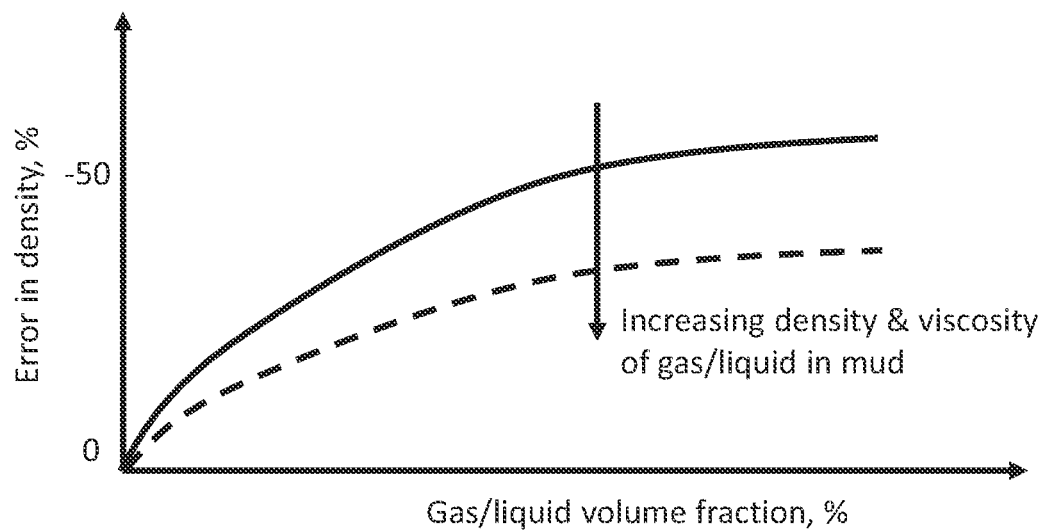
FIG. 5A depicts illustrative calibration curves for error in density according to one or more embodiments of the present disclosure.
Figure 5B:
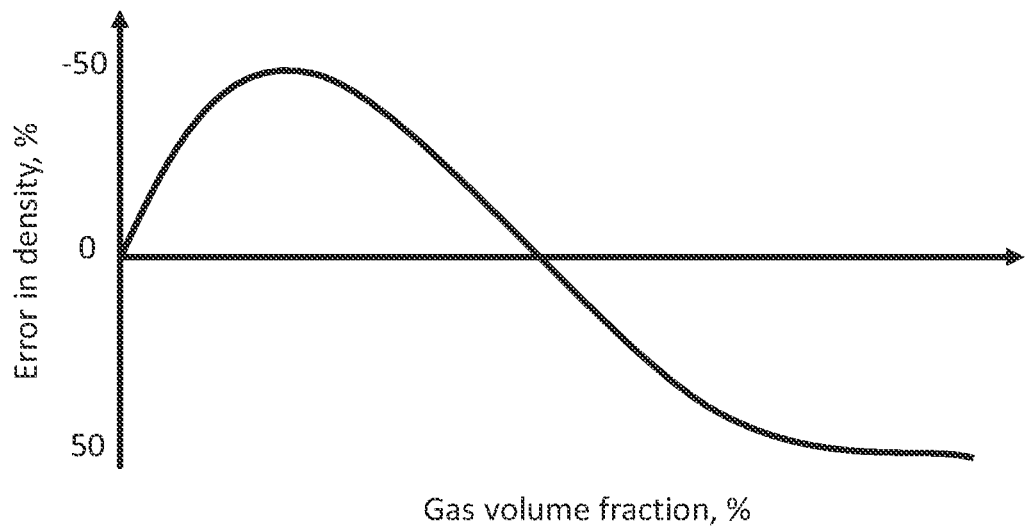
FIG. 5B depicts another illustrative calibration curves for error in density according to one or more embodiments of the present disclosure.

When the Coriolis meter 154 is operating in an online mode such as during drilling operations, the programed error curves, for example, as illustrated in FIGS. 5A and 5B, are used to automatically correct the density and mass flow rate of the flowing mud based on the measured frequency and phase shift from the Coriolis meter. In addition, the injection system (e.g., gas injection port 142 and liquid injection port 144) described above may be used to add nitrogen or another gas or a combination of gases and/or a liquid in small proportions (e.g., known amounts) to perform online corrections to the calibration of the Coriolis meter 154 as the density and flow rate of the injected fluids is known. The measurements from the Coriolis meter and the differential pressure across the Coriolis meter, with or without injected fluids, in combination with calculations carried out using Equations 1-5, as described herein, reduce measurement uncertainty.

Referring to FIGS. 5A and 5B, the calibration curve will depend on the type of mud used and the properties of the fluids that may be mixed in the mud. For example, when gas is mixed with the mud, the density and mass flow rate reported by the Coriolis meter includes errors. For free gas bubbles in the mud, the error in density may be modelled using Equation 3. FIG. 5A depicts illustrative curves for error in density and the changes in the error in density curve as the density and viscosity of gas/liquid in the mud increases. This error is usually negative and the magnitude of error increases with increasing gas volume fraction. Since mud is a mixture of several components, the error curve depends on how different the density and viscosity of the additional materials (e.g., gas and/or liquid) are with respect to the drilling mud. For example, gas is the most extreme in this case because it has almost negligible density and viscosity when compared with the mud.

Figure 5C:
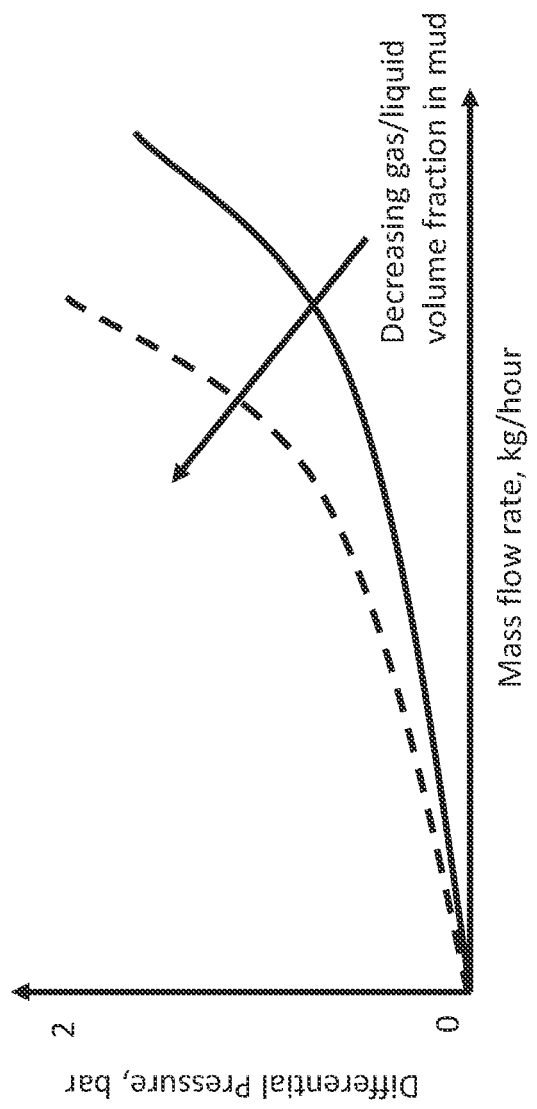
FIG. 5C depicts illustrative curve of the relationship between the differential pressure and mass flow rate according to one or more embodiments of the present disclosure.

For gas that is dissolved within the other fluids in the mud, the calibration curve may look appear more like the curve depicted in FIG. 5B. As depicted in FIG. 5B, the error may initially be negative and then become positive. For liquids mixed in the drilling mud, the error curve shown in FIG. 5A may be more appropriate. In further embodiments, the pressure drop across the Coriolis meter 154 measured by the differential pressure sensor 156 is a function of the total mass flow rate and the equivalent density and viscosity of the mixture as illustratively depicted in FIG. 5C. That is, as described in more detail herein, the differential pressure sensor 156 provides an independent measure of the mass flow rate. With an independent measure of mass flow rate, the mud flow measurement module 210A is programmed to iterate between calibration curves, for example, as depicted in FIG. 5A and FIG. 5C until a convergence on the fraction of liquid and gas entrained in the multiphase drilling mud is obtained. As depicted in FIG. 5C, as the gas and/or liquid volume fraction in the multiphase drilling mud decreases the differential pressure is becomes greater for lower mass flow rates.

Referring back to FIG. 3, the differential pressure sensor 156 is configured to measure the differential pressure across the Coriolis meter 154 is implemented. The differential pressure sensor 156 measures the pressure drop across the Coriolis meter 154. The differential pressure sensor 156 may be a sealed differential pressure sensor. For example, in one embodiment, a dielectric oil partially filled pipe, having a smaller diameter than the flow pipe 140, connects the differential pressure sensor to either side of the Coriolis meter 154. The pressure from the mud is conveyed to the differential pressure sensor through the flexible diaphragm that lies at the boundary between the flow pipe 140 and the smaller diameter pipe. A first diaphragm on one side is connected upstream of the Coriolis meter 154 and a second diaphragm is connected downstream of the Coriolis meter 154.

The mass flow rate through the mud flow measurement system is estimated by the differential pressure drop (dP) created by fluid flow across the Coriolis meter 154. In some embodiments, a differential pressure sensor 156 is implemented to measure the pressure, p1, of the fluid before entering the Coriolis meter 154 and the pressure, p2, of the fluid within the Coriolis meter 154 to obtain a differential pressure drop across the Coriolis meter 154. In some embodiments, the different pressure sensor 156 utilizes the absolute pressure measurement from absolute pressure sensor 152 for determining the pressure, p1, of the fluid before entering the Coriolis meter 154 and a pressure, p2, of the fluid in the Coriolis meter 154 to generate a differential pressure drop (dP) created by fluid flow across the Coriolis meter 154. In embodiments, the differential pressure measurement is used to determine the mass flow rate. For example, the mass flow rate, $Q_{mass}$, is a function of the volumetric flow rate, Q, multiplied by the density, $\rho$. Accordingly, the differential pressure sensor provides a second estimate of the mass flow rate of the multiphase drilling mud using Equation 5 as follows:

$$Q_{mass} = \frac{C_d A_t}{\sqrt{1-\beta^4}} \sqrt{2\rho * \Delta P}, \quad \text{Eq. 5}$$

where $C_d$ is a calibration constant (determined empirically with different types of mud and entrained fluids), $A_t$ is a cross-sectional area $$\left[A_t = \pi\left(\frac{d_t}{2}\right)^2\right]$$

of the measurement tube of the Coriolis meter, $\beta$ is a ratio the internal diameter, $d_t$, of the measurement tube within the Coriolis meter 154 and the internal diameter of the flow pipe 140 before the Coriolis meter, $\rho$ is the density of the multiphase mud, and $\Delta P$ is the differential pressure across the Coriolis meter determined from the differential pressure sensor 156.

In an offline mode, for example, during the mud flow loop tests (e.g., calibration experiments), the differential pressure across the Coriolis meter 154 is measured and a calibration curve is developed for each type of drilling mud having various levels of impurities. During calibration experiments, a fluid with a known density, p, is directed to flow through the Coriolis meter with a differential pressure sensor, such as a Venturi meter. Using the right side of Equation 5, the mass flow rate is calculated from the measured differential pressure, assuming $C_d=1$.

However, in experiment, it is certain that the mass flow rate, (i.e., the left side of Equation 5), would be smaller than the calculated result, (i.e., from the right side of Equation 5). The discrepancy is due to the energy losses that occurs when fluid passes through the differential pressure sensor, as such, it is accounted by adjusting $C_d$ to a value less than 1. The value of $C_d$ is adjusted to make the calculated value from physics to be the same as the experimentally obtained value. As a result, a calibration constant, $C_d$, under each flow condition and for each type of drilling mud is obtained.

In one embodiment, when the mud flow measurement system 150 is employed in a drilling process, a calibration curve corresponding to the type of drilling mud injected into the well is selected. The calibration curve defines a calibration constant, $C_d$. The density of the flowing fluid is obtained as a measurement from the Coriolis meter 154. Additionally, a differential pressure is obtained using the differential pressure sensor 156. Then, using Equation 5, the mass flow rate of the multiphase drilling mud is calculated. In another embodiment, the density of multiphase drilling mud is estimated by using the mass flow rate measurement obtained from the Coriolis meter 154 using Equation 5.

Figure 6:
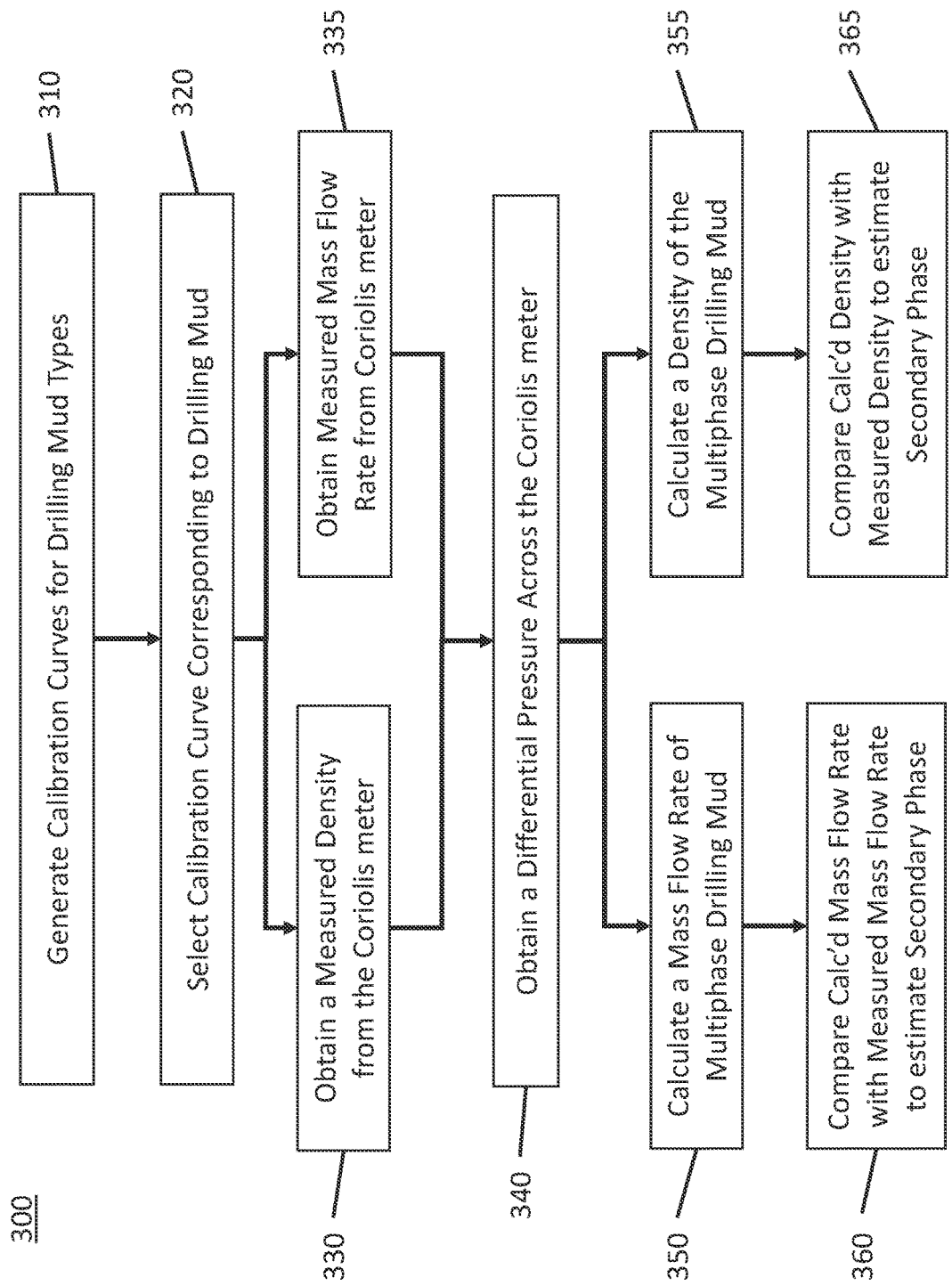
FIG. 6 depicts a flow diagram of an illustrative mud flow measurement method according to one or more embodiments described herein.

Referring to FIG. 6, a flow diagram 300 of an illustrative mud flow measurement method according to one or more embodiments described herein. The mud flow measurement module 210A and components of the mud flow measurement system 150 are configured to employ the method. The mud flow measurement method will now be described with reference to the aforementioned disclosure. At block 310, in an offline mode, the mud flow measurement module 210A and the mud flow measurement system 150 generates calibration curves for drilling mud types having various amounts of secondary phase material. As used herein, "offline mode" refers to instances where the mud flow measurement system 150 is not actively operating in a drilling process. Instead, the mud flow measurement system 150 is operating in a controlled or experimental process such as a calibration process. As described herein, generating calibration curves for various types of drilling muds includes injecting a predefined type of drilling mud into the mud flow measurement system 150 and varying amounts of secondary phase material entrained in the drilling mud. Measurements obtained by the Coriolis meter 154 and the differential pressure sensor 156 provide data points that inform calibration curves and/or training data for a nonlinear model or a neural network model.

At block 320, when the mud flow measurement system 150 is operating in an "online mode" such as when the system is implemented and operational during a drilling process, a calibration curve (e.g., including calibration constants and other calibration information) corresponding to the drilling mud type being used during the drilling operation is selected. For example, in some embodiments, an operator may select or predefine within the mud flow measurement module 210A the type of drilling mud used for the drilling operation. The mud flow measurement module 210A may then retrieve the calibration curve from a memory component 230 or other storage device communicatively coupled to the mud flow measurement module 210A. The mud flow measurement method may then proceed in one of two or in both of the following ways. In one instance, the mud flow measurement module 210A, at block 330 obtains one or more signals from the Coriolis meter 154 and determines a measured density based on the one or more signals. At block 335, the mud flow measurement module 210A obtains one or more signals from the Coriolis meter 154 and determines a measured mass flow rate based on the one or more signals. Furthermore, the mud flow measurement module 210A receives one or more signals from the differential pressure sensor 156 positioned to generate signals indicative of the pressure drop across the Coriolis meter 154. Based on the one or more signals from the differential pressure sensor 156, the mud flow measurement module 210A determines the differential pressure.

Based on the determined measured density and/or mass flow rate and the differential pressure, the mud flow measurement module 210A is configured to determine a calculated mass flow rate and/or calculated density, respectively. In one instance, at block 350, the mud flow measurement module 210A calculates the mass flow rate of the multiphase drilling fluid based on the measured density and measured differential pressure. The calculation may be carried out by computing Equation 5 described above, using the calibration curve/calibration constant defined for the particular type of drilling mud that is being used in the drilling operation. In some embodiments, a further determination is made, optionally in an iterative manner until a convergence is obtained. The determination includes comparing the calculated mass flow rate with the measured mass flow rate to obtain an error in mass flow rate, which through the calibration curve, an estimate of the volume percentage of the secondary phase in the multiphase drilling mud flowing through the mud flow measurement system is made by the mud flow measurement module 210A.

In another instance, at block 355, the mud flow measurement module 210A calculates the density of the multiphase drilling fluid based on the measured mass flow rate and measured differential pressure. The calculation may be carried out by computing Equation 5 described above, using the calibration curve/calibration constant defined for the particular type of drilling mud that is being used in the drilling operation. In some embodiments, a further determination is made, optionally in an iterative manner until a convergence is obtained. The determination includes comparing the calculated density with the measured density to obtain an error in density, which through the calibration curve (e.g., FIGS. 5A, 5B), an estimate of the volume percentage of the secondary phase in the multiphase drilling mud flowing through the mud flow measurement system 150 is made by the mud flow measurement module 210A.

It should be understood that the aforementioned method of is merely exemplary and that variations on the process may be embodied by the systems described herein. Additionally, it should be understood that steps of the aforementioned processes may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

In another embodiment, the mud flow measurement system implements a nonlinear model within the mud flow measurement module 210A. The inputs to the nonlinear model include density, mass flow rate, and temperature from the Coriolis meter 154, the pressure from the absolute pressure sensor 152, and differential pressure from the differential pressure sensor 156. The outputs of the model are the total mass flow rate of all fluids and the volume fractions of the primary phase, secondary phase, and, optionally, a tertiary phase within the multiphase drilling mud. Since the sum of the phase fraction of the three phases is unity, only two phases need to be estimated in order to obtain the third.

Figure 7:
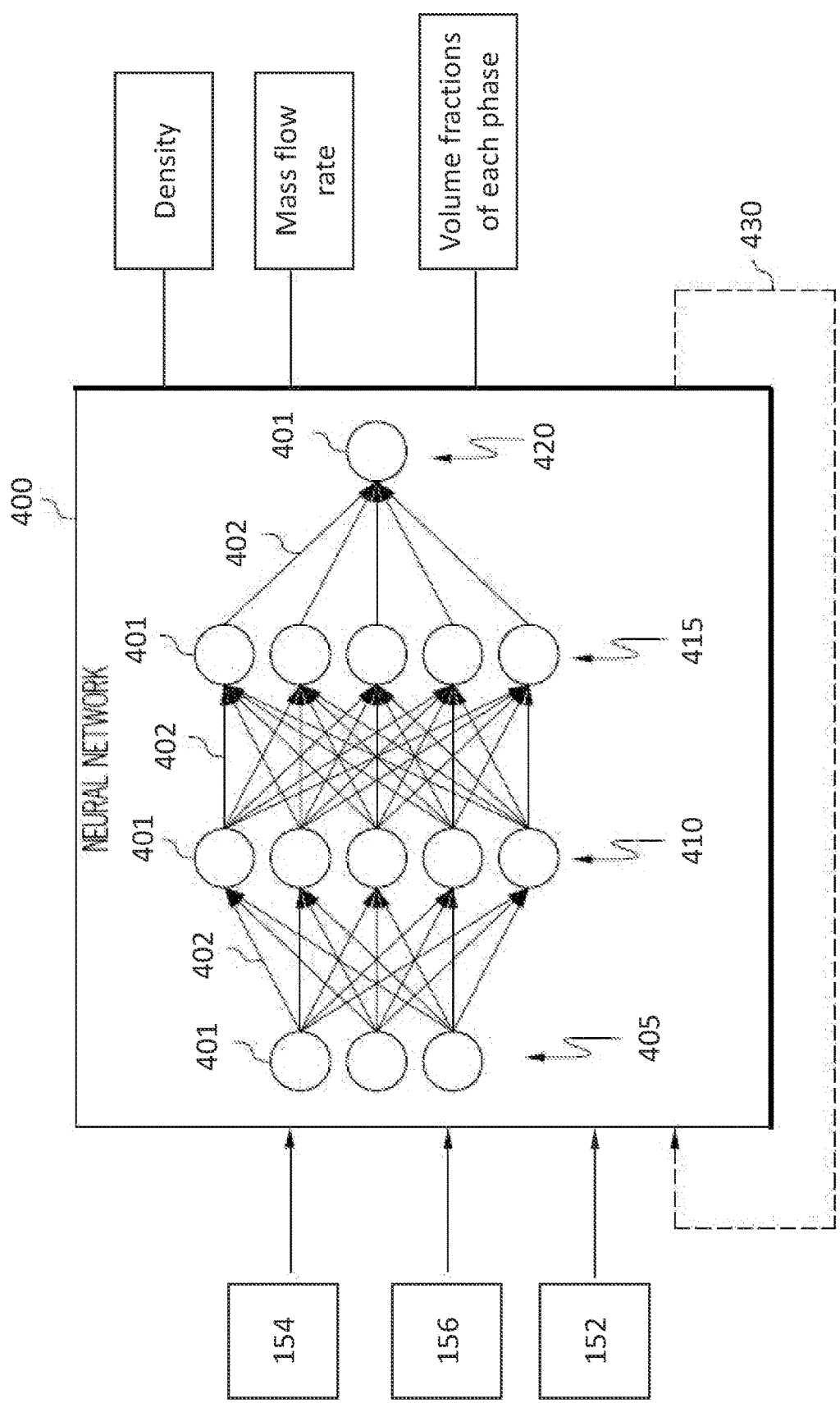
FIG. 7 depicts an illustrative diagram for a neural network model according to one or more embodiments shown and described herein.

In a further embodiment, the mud flow measurement system 150 may implement a machine learned model, such as a neural network model trained to provide a predication as to the density, total mass flow rate of all fluids and the volume fractions of the primary phase, secondary phase, and, optionally, a tertiary phase within the multiphase drilling mud. Turning to FIG. 7, an illustrative neural network model for determining the density, mass flow rate, and volume fractions of the multiphase drilling mud expended from the well is depicted. Training the model includes utilizing a first portion of the calibration data and calibration testing in an offline mode. Validating the model includes utilizing a second portion of calibration data before deploying the neural network on in operational drilling process.

A neural network model generally includes one or more layers 405, 410, 415, 420, having one or more nodes 401, connected by node connections 402. The one or more layers 405, 410, 415, 420 may include an input layer 405, one or more hidden layers 410, 415, and an output layer 420. The neural network model 400 may be a deep neural network, a convolutional neural network, or other type of neural network. The neural network model 400 may include one or more convolution layers and one or more fully connected layers. The input layer 405 represents the raw information that is fed into the neural network model 400. For example, measurement data from the Coriolis meter 154, the differential pressure sensor 156, and the absolute pressure sensor 152 may be input into the neural network model 400 at the input layer 405. In the training mode, there neural network model 400 may employ one or more feedback or back-propagation techniques depicted by feedback loop 430 to train the neural network paths.

The neural network model 400 processes the raw information received at the input layer 405 through nodes 401 and node connections 402. The one or more hidden layers 410, 415, depending on the inputs from the input layer 405 and the weights on the node connections 402, carry out computational activities. In other words, the hidden layers 410, 415 perform computations and transfer information from the input layer 405 to the output layer 420 through their associated nodes 401 and node connections 402.

In general, when a neural network model 400 is learning, the neural network model 400 is identifying and determining patterns within the raw information received at the input layer 405. In response, one or more parameters, for example, weights associated to node connections 402 between nodes 401, may be adjusted through a process known as back-propagation. It should be understood that there are various processes in which learning may occur, however, two general learning processes include associative mapping and regularity detection. Associative mapping refers to a learning process where a neural network model 400 learns to produce a particular pattern on the set of inputs whenever another particular pattern is applied on the set of inputs. Regularity detection refers to a learning process where the neural network learns to respond to particular properties of the input patterns. Whereas in associative mapping the neural network stores the relationships among patterns, in regularity detection the response of each unit has a particular 'meaning'. This type of learning mechanism may be used for feature discovery and knowledge representation.

Neural networks possess knowledge that is contained in the values of the node connection weights. Modifying the knowledge stored in the network as a function of experience implies a learning rule for changing the values of the weights. Information is stored in a weight matrix W of a neural network. Learning is the determination of the weights. Following the way learning is performed, two major categories of neural networks can be distinguished: 1) fixed networks in which the weights cannot be changed (i.e., dW/dt=0), and 2) adaptive networks which are able to change their weights (i.e., dW/dt not=0). In fixed networks, the weights are fixed a priori according to the problem to solve.

In order to train a neural network model 400 to perform some task, adjustments to the weights are made in such a way that the error between the desired output and the actual output is reduced. This process may require that the neural network model 400 computes the error derivative of the weights (EW). In other words, it must calculate how the error changes as each weight is increased or decreased slightly. A back propagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the neural network model 400, hence "back propagation". Once the EA has been computed for a unit, it is straight forward to compute the EW for each incoming connection of the unit. The EW is the product of the EA and the activity through the incoming connection. It should be understood that this is only one method in which a neural network model 400 is trained to perform a task.

Still referring to FIG. 7, the neural network model 400 may include one or more hidden layers 410, 415 that feed into one or more nodes 401 of an output layer 420. There may be one or more output layers 420 depending on the particular output the neural network model 400 is configured to generate. In the present embodiments, the outputs may include a density, mass flow rate, and volume fractions for one or more of the phases of the multiphase drilling mud.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present concept, it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

In a first aspect A1 of the present disclosure, a mud flow measurement system includes a flow pipe, a Coriolis meter, a differential pressure sensor, and a mud flow measurement module. The flow pipe is configured to direct a portion of the multiphase mud flow from a well to the Coriolis meter and differential pressure sensor. The Coriolis meter comprises a measuring tube and two or more vibration sensors. The measuring tube is induced to oscillate. The vibration sensors are positioned at different locations along the measuring tube. Each vibration sensor is configured to generate a signal in response to the multiphase mud flow through the Coriolis meter from the well. The differential pressure sensor is positioned to generate a signal corresponding to a pressure drop across the Coriolis meter in response to the multiphase mud flow flowing through the mud flow measurement system. The mud flow measurement module is coupled to the Coriolis meter and the differential pressure sensor, and is configured to select a calibration curve corresponding to a drilling mud injected into the well from a library of calibration curves for the Coriolis meter corresponding to different types of drilling muds, determine a measured density based on the signal from each of the vibration sensors of the Coriolis meter and the selected calibration curve, determine a differential pressure across the Coriolis meter based on one or more signals generated by the differential pressure sensor, and compute a calculated mass flow rate, $Q_{mass}$, of the multiphase mud flow using equation $$Q_{mass} = \frac{C_d A_t}{\sqrt{1-\beta^4}} \sqrt{2\rho * \Delta P},$$

where $C_d$ is a calibration constant, $A_t$ is a cross-sectional area of the measurement tube of the Coriolis meter, $\beta$ is a ratio of an internal diameter of the flow pipe and an internal diameter of the measuring tube of the Coriolis meter, $\rho$ is the density of the multiphase mud, and $\Delta P$ is the differential pressure across the Coriolis meter determined from the differential pressure sensor, where $\rho$ is the measured density determined from the Coriolis meter.

A second aspect A2 according to the first aspect A1, the mud flow measurement module is further configured to determine a measured mass flow rate based on the signal from each of the vibration sensors of the Coriolis meter and the selected calibration curve, and determine a calculated density of the multiphase mud flow based on the measured mass flow rate and the differential pressure across the Coriolis meter.

A third aspect A3 according to any preceding aspect, the mud flow measurement module is further configured to: compare the calculated mass flow rate with the measured mass flow rate, and estimate a secondary phase of the multiphase mud based on the comparison of the calculated mass flow rate with the measured mass flow rate and the selected calibration curve.

A fourth aspect A4 according to any preceding aspect, the mud flow measurement module is further configured to: compare the calculated density with the measured density, and estimate a secondary phase of the multiphase mud based on the comparison of the calculated density with the measured density and the selected calibration curve.

A fifth aspect A5 according to any preceding aspect, the Coriolis meter is a serial path Coriolis meter.

A sixth aspect A6 according to any preceding aspect, further comprising an absolute pressure sensor positioned upstream of the Coriolis meter and wherein the mud flow measurement module is further configured to: determine a pressure of the multiphase mud flow in the flow pipe based on a signal from the absolute pressure sensor, and determine a volume of the multiphase mud entrained with a compressible fluid.

A seventh aspect A7 according to any preceding aspect, further comprising an injection system comprising an injection port configured to inject a fluid comprising at least one of a gas or a liquid into the flow pipe upstream of the Coriolis meter, wherein injecting amounts of the fluid adjust at least one of the density or mass flow rate of the multiphase mud flow.

In an eighth aspect A8 of the present disclosure, a mud flow measurement method is implemented by a mud flow measurement system including a Coriolis meter having a measuring tube and two or more vibration sensors, a differential pressure sensor positioned to generate a signal corresponding to a pressure drop across the Coriolis meter in response to the multiphase mud flow flowing through the mud flow measurement system, and a flow pipe configured to direct a portion of the multiphase mud flow from a well to the Coriolis meter and the differential pressure sensor. The method includes selecting a calibration curve corresponding to a drilling mud injected into the well from a library of calibration curves for the Coriolis meter corresponding to different types of drilling muds; determining a measured density based on a signal from the Coriolis meter and the selected calibration curve; determining a differential pressure across the Coriolis meter based on one or more signals generated by the differential pressure sensor; and computing a calculated mass flow rate, $Q_{mass}$, of the multiphase mud flow using equation $$Q_{mass} = \frac{C_d A_t}{\sqrt{1-\beta^4}} \sqrt{2\rho * \Delta P},$$

where $C_d$ is a calibration constant, $A_t$ is a cross-sectional area of the measurement tube of the Coriolis meter, $\beta$ is a ratio of an internal diameter of the flow pipe and an internal diameter of the measuring tube of the Coriolis meter, $\rho$ is the density of the multiphase mud, and $\Delta P$ is the differential pressure across the Coriolis meter determined from the differential pressure sensor, where $\rho$ is the measured density determined from the Coriolis meter.

A ninth aspect A9 according to the eighth aspect A8, further comprising determining a measured mass flow rate based on the signal from the Coriolis meter and the selected calibration curve; and determining a calculated density of the multiphase mud flow based on the measured mass flow rate and the differential pressure across the Coriolis meter.

A tenth aspect A10 according to any preceding aspect, further comprising: comparing the calculated mass flow rate with the measured mass flow rate; and estimating a secondary phase of the multiphase mud based on the comparison of the calculated mass flow rate with the measured mass flow rate and the selected calibration curve.

An eleventh aspect A11 according to any preceding aspect, further comprising: comparing the calculated density with the measured density; and estimating a secondary phase of the multiphase mud based on the comparison of the calculated density with the measured density and the selected calibration curve.

A twelfth aspect A12 according to any preceding aspect, the Coriolis meter is a serial path Coriolis meter.

A thirteenth aspect A13 according to any preceding aspect, further comprising: determining a pressure of the multiphase mud flow in the flow pipe based on a signal from an absolute pressure sensor, and determining a volume of the multiphase mud entrained with a compressible fluid.

A fourteenth aspect A14 according to an preceding aspect, further comprising adjusting at least one of the density or mass flow rate of the multiphase mud flow by injecting a fluid comprising at least one of a gas or a liquid through an injection system comprising an injection port configured to inject the fluid into the flow pipe upstream of the Coriolis meter.

In a fifteenth aspect A15, a mud flow measurement system includes a flow pipe, a Coriolis meter, a differential pressure sensor, and a mud flow measurement module. The flow pipe is configured to direct a portion of the multiphase mud flow from a well to the Coriolis meter and the differential pressure sensor. The Coriolis meter comprises a measuring tube and two or more vibration sensors. The measuring tube is induced to oscillate. The vibration sensors are positioned at different locations along the measuring tube. Each vibration sensor is configured to generate a signal in response to the multiphase mud flow through the Coriolis meter from the well. The differential pressure sensor is positioned to generate a signal corresponding to a pressure drop across the Coriolis meter in response to the multiphase mud flow flowing through the mud flow measurement system. The mud flow measurement module is coupled to the Coriolis meter and the differential pressure sensor, and is configured to select a calibration curve corresponding to a drilling mud injected into the well from a library of calibration curves for the Coriolis meter corresponding to different types of drilling muds, determine a measured mass flow rate based on the signal from each of the vibration sensors of the Coriolis meter and the selected calibration curve, determine a differential pressure across the Coriolis meter based on one or more signals generated by the differential pressure sensor, and compute a calculated density, p, of the multiphase mud flow based on the measured mass flow rate from the Coriolis meter and the differential pressure across the Coriolis meter.

A sixteenth aspect A16 according to the fifteenth aspect A15, the mud flow measurement module is further configured to: determine a measured density based on the signal from each of the vibration sensors of the Coriolis meter and the selected calibration curve, and determine a calculated mass flow rate of the multiphase mud flow based on the measured density and the differential pressure across the Coriolis meter.

A seventeenth aspect A17 according any preceding aspect, the mud flow measurement module is further configured to: compare the calculated mass flow rate with the measured mass flow rate, and estimate a secondary phase of the multiphase mud based on the comparison of the calculated mass flow rate with the measured mass flow rate and the selected calibration curve.

An eighteenth aspect A18 according any preceding aspect, the mud flow measurement module is further configured to: compare the calculated density with the measured density, and estimate a secondary phase of the multiphase mud based on the comparison of the calculated density with the measured density and the selected calibration curve.

A nineteenth aspect A19 according any preceding aspect, the Coriolis meter is a serial path Coriolis meter.

A twentieth aspect A20 according any preceding aspect, further comprising an absolute pressure sensor positioned upstream of the Coriolis meter and wherein the mud flow measurement module is further configured to: determine a pressure of the multiphase mud flow in the flow pipe based on a signal from the absolute pressure sensor, and determine a volume of the multiphase mud entrained with a compressible fluid.

What is claimed is:

1. A mud flow measurement system comprising a flow pipe, a Coriolis meter, a differential pressure sensor, and a mud flow measurement module, wherein:
the flow pipe is configured to direct a portion of the multiphase mud flow from a well to the Coriolis meter and the differential pressure sensor;
the Coriolis meter comprises a measuring tube and two or more vibration sensors;
the measuring tube is induced to oscillate;
the vibration sensors are positioned at different locations along the measuring tube;
each vibration sensor is configured to generate a signal in response to the multiphase mud flow through the Coriolis meter from the well;
the differential pressure sensor is positioned to generate a signal corresponding to a pressure drop across the Coriolis meter in response to the multiphase mud flow flowing through the mud flow measurement system; and
the mud flow measurement module is coupled to the Coriolis meter and the differential pressure sensor, and is configured to:
select a calibration curve corresponding to a drilling mud injected into the well from a library of calibration curves for the Coriolis meter corresponding to different types of drilling muds, wherein calibration curves in the library of calibration curves for the Coriolis meter define a relationship between error in density and density for one or more drilling muds,
determine a measured density based on the signal from each of the vibration sensors of the Coriolis meter and the selected calibration curve,
determine a differential pressure across the Coriolis meter based on one or more signals generated by the differential pressure sensor, and
compute a calculated mass flow rate, $Q_{mass}$, of the multiphase mud flow using equation $$Q_{mass} = \frac{C_d A_t}{\sqrt{1-\beta^4}} \sqrt{2\rho * \Delta P}$$

where $C_d$ is a calibration constant, $A_t$ is a cross-sectional area of the measurement tube of the Coriolis meter, $\beta$ is a ratio of an internal diameter of the flow pipe and an internal diameter of the measuring tube of the Coriolis meter, $\rho$ is the density of the multiphase mud, and $\Delta P$ is the differential pressure across the Coriolis meter determined from the differential pressure sensor, wherein
$\rho$ is the measured density determined from the Coriolis meter.

2. The mud flow measurement system of claim 1, wherein the mud flow measurement module is further configured to:
determine a measured mass flow rate based on the signal from each of the vibration sensors of the Coriolis meter and the selected calibration curve, and
determine a calculated density of the multiphase mud flow based on the measured mass flow rate and the differential pressure across the Coriolis meter.

3. The mud flow measurement system of claim 2, wherein the mud flow measurement module is further configured to:
compare the calculated mass flow rate with the measured mass flow rate, and
estimate a secondary phase of the multiphase mud based on the comparison of the calculated mass flow rate with the measured mass flow rate and the selected calibration curve.

4. The mud flow measurement system of claim 2, wherein the mud flow measurement module is further configured to:
compare the calculated density with the measured density, and
estimate a secondary phase of the multiphase mud based on the comparison of the calculated density with the measured density and the selected calibration curve.

5. The mud flow measurement system of claim 1, wherein the Coriolis meter is a serial path Coriolis meter.

6. The mud flow measurement system of claim 1, further comprising an absolute pressure sensor positioned upstream of the Coriolis meter and wherein the mud flow measurement module is further configured to:
  determine a pressure of the multiphase mud flow in the flow pipe based on a signal from the absolute pressure sensor, and
  determine a volume of the multiphase mud entrained with a compressible fluid.

7. The mud flow measurement system of claim 1, further comprising an injection system comprising an injection port configured to inject a fluid comprising at least one of a gas or a liquid into the flow pipe upstream of the Coriolis meter, wherein injecting amounts of the fluid adjust at least one of the density or mass flow rate of the multiphase mud flow.

8. A mud flow measurement method implemented by a mud flow measurement system including a Coriolis meter having a measuring tube and two or more vibration sensors, a differential pressure sensor positioned to generate a signal corresponding to a pressure drop across the Coriolis meter in response to the multiphase mud flow flowing through the mud flow measurement system, and a flow pipe configured to direct a portion of the multiphase mud flow from a well to the Coriolis meter and the differential pressure sensor, the method comprising:
  selecting a calibration curve corresponding to a drilling mud injected into the well from a library of calibration curves for the Coriolis meter corresponding to different types of drilling muds, wherein calibration curves in the library of calibration curves for the Coriolis meter define a relationship between error in density and density for one or more drilling muds;
  determining a measured density based on a signal from the Coriolis meter and the selected calibration curve;
  determining a differential pressure across the Coriolis meter based on one or more signals generated by the differential pressure sensor; and
  computing a calculated mass flow rate, $Q_{mass}$, of the multiphase mud flow using equation $$Q_{mass} = \frac{C_d A_t}{\sqrt{1-\beta^4}} \sqrt{2\rho * \Delta P}$$

where $C_d$ is a calibration constant, $A_t$ is a cross-sectional area of the measurement tube of the Coriolis meter, $\beta$ is a ratio of an internal diameter of the flow pipe and an internal diameter of the measuring tube of the Coriolis meter, $\rho$ is the density of the multiphase mud, and $\Delta P$ is the differential pressure across the Coriolis meter determined from the differential pressure sensor, wherein
  $\rho$ is the measured density determined from the Coriolis meter.

9. The method of claim 8, further comprising:
  determining a measured mass flow rate based on the signal from the Coriolis meter and the selected calibration curve; and
  determining a calculated density of the multiphase mud flow based on the measured mass flow rate and the differential pressure across the Coriolis meter.

10. The method of claim 9, further comprising:
  comparing the calculated mass flow rate with the measured mass flow rate; and
  estimating a secondary phase of the multiphase mud based on the comparison of the calculated mass flow rate with the measured mass flow rate and the selected calibration curve.

11. The method of claim 9, further comprising:
  comparing the calculated density with the measured density; and
  estimating a secondary phase of the multiphase mud based on the comparison of the calculated density with the measured density and the selected calibration curve.

12. The method of claim 8, wherein the Coriolis meter is a serial path Coriolis meter.

13. The method of claim 8, further comprising:
  determining a pressure of the multiphase mud flow in the flow pipe based on a signal from an absolute pressure sensor, and
  determining a volume of the multiphase mud entrained with a compressible fluid.

14. The method of claim 8, further comprising adjusting at least one of the density or mass flow rate of the multiphase mud flow by injecting a fluid comprising at least one of a gas or a liquid through an injection system comprising an injection port configured to inject the fluid into the flow pipe upstream of the Coriolis meter.

15. A mud flow measurement system comprising a flow pipe, a Coriolis meter, a differential pressure sensor, and a mud flow measurement module, wherein:
  the flow pipe is configured to direct a portion of the multiphase mud flow from a well to the Coriolis meter and the differential pressure sensor;
  the Coriolis meter comprises a measuring tube and two or more vibration sensors;
  the measuring tube is induced to oscillate;
  the vibration sensors are positioned at different locations along the measuring tube;
  each vibration sensor is configured to generate a signal in response to the multiphase mud flow through the Coriolis meter from the well;
  the differential pressure sensor is positioned to generate a signal corresponding to a pressure drop across the Coriolis meter in response to the multiphase mud flow flowing through the mud flow measurement system; and
  the mud flow measurement module is coupled to the Coriolis meter and the differential pressure sensor, and is configured to
    select a calibration curve corresponding to a drilling mud injected into the well from a library of calibration curves for the Coriolis meter corresponding to different types of drilling muds, wherein calibration curves in the library of calibration curves for the Coriolis meter include error in mass flow rate for one or more drilling muds,
    determine a measured mass flow rate based on the signal from each of the vibration sensors of the Coriolis meter and the selected calibration curve,
    determine a differential pressure across the Coriolis meter based on one or more signals generated by the differential pressure sensor, and
    compute a calculated density, p, of the multiphase mud flow based on the measured mass flow rate from the Coriolis meter and the differential pressure across the Coriolis meter.

16. The mud flow measurement system of claim 15, wherein the mud flow measurement module is further configured to:

determine a measured density based on the signal from each of the vibration sensors of the Coriolis meter and the selected calibration curve, and determine a calculated mass flow rate of the multiphase mud flow based on the measured density and the differential pressure across the Coriolis meter.

17. The mud flow measurement system of claim 16, wherein the mud flow measurement module is further configured to:

compare the calculated mass flow rate with the measured mass flow rate, and estimate a secondary phase of the multiphase mud based on the comparison of the calculated mass flow rate with the measured mass flow rate and the selected calibration curve.

18. The mud flow measurement system of claim 16, wherein the mud flow measurement module is further configured to:

compare the calculated density with the measured density, and estimate a secondary phase of the multiphase mud based on the comparison of the calculated density with the measured density and the selected calibration curve.

19. The mud flow measurement system of claim 15, wherein the Coriolis meter is a serial path Coriolis meter.

20. The mud flow measurement system of claim 15, further comprising an absolute pressure sensor positioned upstream of the Coriolis meter and wherein the mud flow measurement module is further configured to:

determine a pressure of the multiphase mud flow in the flow pipe based on a signal from the absolute pressure sensor, and determine a volume of the multiphase mud entrained with a compressible fluid.

* * * * *